United States Patent
Burenius

(10) Patent No.: US 10,652,663 B1
(45) Date of Patent: May 12, 2020

(54) ENDPOINT DEVICE USING THE PRECEDENCE EFFECT TO IMPROVE ECHO CANCELLATION PERFORMANCE

(71) Applicant: Cisco Technology, Inc., San Jose, CA (US)

(72) Inventor: Lennart Burenius, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/398,809

(22) Filed: Apr. 30, 2019

(51) Int. Cl.
| | |
|---|---|
| H04R 5/04 | (2006.01) |
| H04R 3/00 | (2006.01) |
| H04R 3/04 | (2006.01) |
| H04R 3/12 | (2006.01) |
| H04R 5/02 | (2006.01) |
| H04R 5/027 | (2006.01) |

(52) U.S. Cl.
CPC .............. *H04R 5/04* (2013.01); *H04R 3/005* (2013.01); *H04R 3/04* (2013.01); *H04R 3/12* (2013.01); *H04R 5/02* (2013.01); *H04R 5/027* (2013.01); *H04R 2430/23* (2013.01)

(58) Field of Classification Search
CPC . H04R 5/04; H04R 3/005; H04R 3/04; H04R 3/12; H04R 5/02; H04R 5/027; H04R 2430/23
See application file for complete search history.

(56) References Cited

U.S. PATENT DOCUMENTS

| | | | |
|---|---|---|---|
| 4,629,829 | A | 12/1986 | Puhl et al. |
| 4,751,730 | A | 6/1988 | Galand et al. |
| 4,792,915 | A | 12/1988 | Adams et al. |
| 5,113,389 | A | 5/1992 | Cox |
| 5,657,384 | A | 8/1997 | Staudacher et al. |
| 6,442,272 | B1 | 8/2002 | Osovets |
| 6,556,682 | B1 | 4/2003 | Gilloire et al. |

(Continued)

FOREIGN PATENT DOCUMENTS

SE      512903 C2   6/2000

OTHER PUBLICATIONS

Wen-Sheng et al., "A precedence effect based far-field DoA estimation algorithm", https://ieeexplore.ieee.org/document/1416211, Mar. 2005, 4 pages.

(Continued)

*Primary Examiner* — Mark Fischer
(74) *Attorney, Agent, or Firm* — Edell, Shapiro & Finnan, LLC

(57) ABSTRACT

An endpoint device includes a microphone array and spaced-apart loudspeakers including an active loudspeaker among the loudspeakers that is closest to the microphone array. The endpoint device forms at the microphone array an audio receive beam having a main lobe pointed in a direction from which audio is to be received, and determines which of the loudspeakers are not in the main lobe. The endpoint device identifies at least one additional loudspeaker among the loudspeakers determined not to be in the main lobe and that is farther away from the microphone array than the active loudspeaker. The endpoint device spreads audio energy of input audio associated with, and intended for, the active loudspeaker across the active loudspeaker and the at least one additional loudspeaker, and no other ones of the loudspeakers, using a precedence effect.

20 Claims, 14 Drawing Sheets

(56) References Cited

U.S. PATENT DOCUMENTS

| | | |
|---|---|---|
| 6,931,123 B1 | 8/2005 | Hughes |
| 6,950,513 B2 | 9/2005 | Hirai et al. |
| 7,315,619 B2 | 1/2008 | Marton et al. |
| 7,660,428 B2 | 2/2010 | Rodman et al. |
| 9,113,264 B2 | 8/2015 | Frater |
| 9,385,779 B2 | 7/2016 | Sun |
| 9,641,947 B2 | 5/2017 | Loether |
| 2004/0174991 A1 | 9/2004 | Hirai et al. |
| 2010/0232609 A1 | 7/2010 | Sungyoung |
| 2018/0220007 A1 | 8/2018 | Sun et al. |

OTHER PUBLICATIONS

Kevin Wilson et al., "Improving Audio Source Localization by Learning the Precedence Effect", https://ieeexplore.ieee.org/document/507459, Jun. 1996, 4 pages.

Jie Huang et al., "Modeling the Precedence Effect for Sound Localization in Reverberant Environment", IEEE Instrumentation and Measurement, Technology Conference, https://ieeexplore.ieee.org/document/6572306, Jun. 4-6, 1996, 4 pages.

Akira Nakagawa, et al., "Channel-number-compressed multi-channel acoustic echo canceller for high-presence teleconferencing system with large display", Acoustics, Speech, and Signal Proceeding, 2000 ICASSP '00. Proceedings. 2000 IEEE International Conference., vol. 2, Jun. 6-9, 2000, https://ieeexplore.ieee.org/abstract/document/859084, pp. 813-816.

Jacob Benesty, et al. "Synthesized Stereo Combined with Acoustic Echo Cancellation for Desktop Conferencing", Bell Labs Technical Journal, Jul.-Sep. 1998, https://ieeexplore.ieee.org/document/6770969, pp. 148-158.

US 10,652,663 B1

ENDPOINT DEVICE USING THE PRECEDENCE EFFECT TO IMPROVE ECHO CANCELLATION PERFORMANCE

TECHNICAL FIELD

The present disclosure relates to loudspeaker processing using the precedence effect.

BACKGROUND

Collaboration endpoints include microphones or microphone arrays for speech pickup and loudspeakers to play audio. Integrating the microphones or microphone arrays with loudspeakers in a small collaboration endpoint is challenging due to a short distance and close coupling between the microphones or microphone arrays and the loudspeakers. In the small collaboration endpoint, an echo-to-near end ratio (ENR) is high, which causes poor acoustical echo cancellation (AEC) performance during double talk. This is especially true in a collaboration endpoint having a housing that combines a loudspeaker in a center of the housing (for proper directional audio) with a wide broadside microphone array.

DESCRIPTION OF EXAMPLE EMBODIMENTS

Overview

An endpoint device includes a microphone array and spaced-apart loudspeakers including an active loudspeaker among the loudspeakers that is closest to the microphone array. The endpoint device forms at the microphone array an audio receive beam having a main lobe pointed in a direction from which audio is to be received, and determines which of the loudspeakers are not in the main lobe. The endpoint device identifies at least one additional loudspeaker among the loudspeakers determined not to be in the main lobe and that is farther away from the microphone array than the active loudspeaker. The endpoint device spreads audio energy of input audio associated with, and intended for, the active loudspeaker across the active loudspeaker and the at least one additional loudspeaker, and no other ones of the loudspeakers, to reduce coupling of sound energy emitted by the active loudspeaker and the at least one additional loudspeaker to the microphone array based on a precedence effect.

Example Embodiments

Embodiments presented herein may be implemented in an endpoint device (referred to simply as an "endpoint") that includes loudspeakers play or emit audio into a space and a microphone array to pickup/receive audio from the space. Endpoints include, but are not limited to, video conference endpoints used for networked collaboration sessions between remote participants, laptop computers, and so on. The embodiments employ the psychoacoustical precedence effect (also known as the "law of the first wave front"), which can be considered as a superset of the Haas effect, to move the generation of sound energy/power emitted from the loudspeakers of the endpoint as far away as possible from the microphone array, without significant audible artifacts or degradation of directional audio performance. It is assumed listeners positioned in a room with the endpoint are in a diffuse sound field outside of a critical distance of the loudspeakers, while the microphones are inside the critical distance. That means the transfer function between each loudspeaker and each microphone of the microphone array is dominated by a direct path of transmission. This approach improves acoustic echo cancellation (AEC) performance as implemented in the endpoint in two ways:

a. A longer distance between the loudspeaker and the microphones lowers the echo-to-near end ratio (ENR), improving full-duplex behavior.
b. Because acoustical energy can be distributed over several loudspeakers over a wider frequency range than typically, each loudspeaker is driven by, and thus emits, less power, which reduces distortion in each loudspeaker. This improves AEC performance (as a bonus it also improves the acoustical efficiency overall, since the total radiating surface area increases).

Use of the precedence effect to improve performance as mentioned above is described below, in general, in connection with FIGS. 1 and 2.

Figure 1:
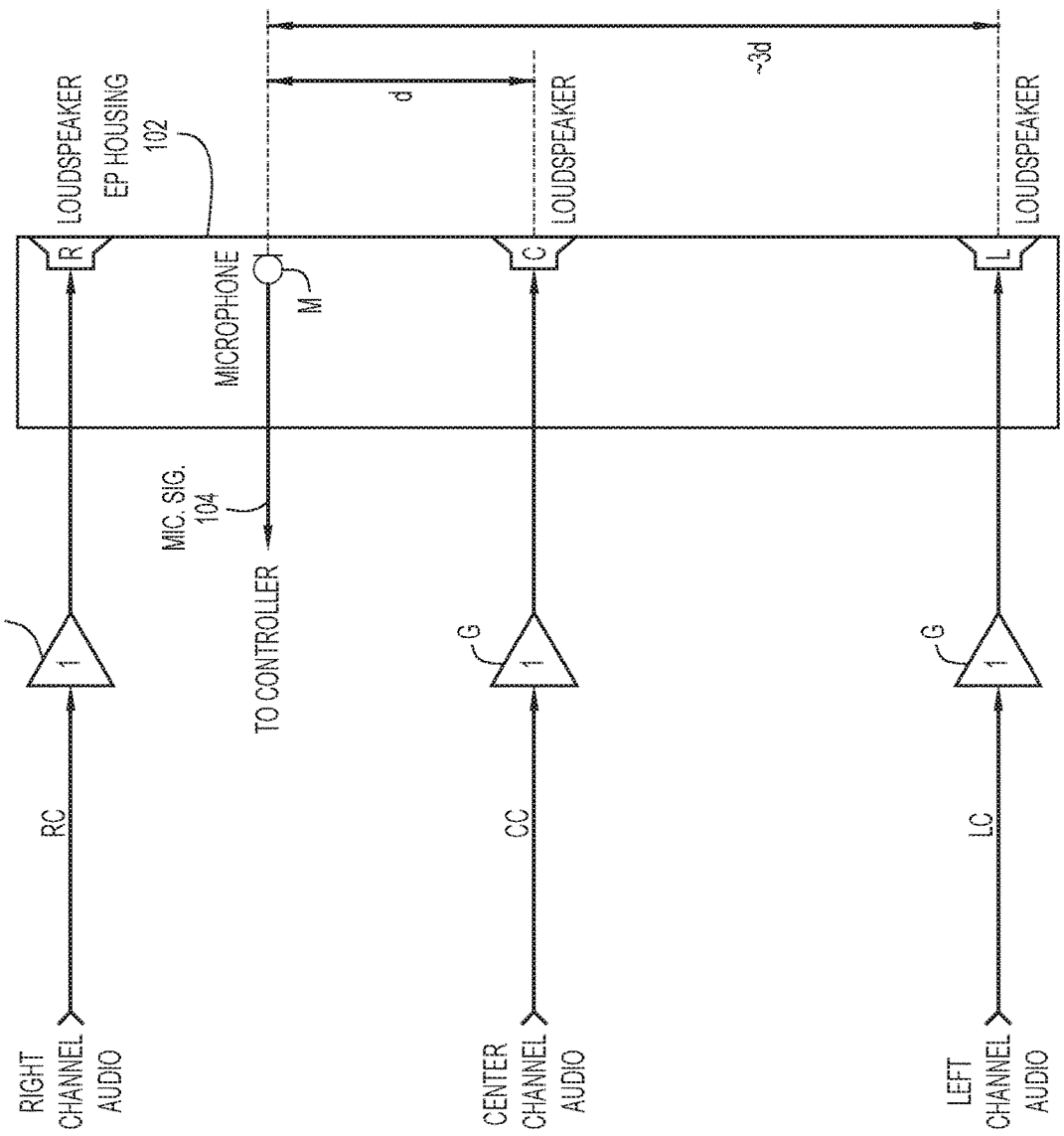
FIG. 1 is an illustration of baseline loudspeaker processing in an endpoint device (referred to as an "endpoint") that does not use the precedence effect to improve acoustical echo cancellation (AEC) performance, according to an example embodiment.

With reference to FIG. 1, there is an illustration of baseline loudspeaker drive processing 100 (also referred to simply as "speaker processing" 100) in an endpoint (EP) that does not use the precedence effect. Loudspeaker processing 100 is implemented in an endpoint (only partially shown in FIG. 1) that includes an endpoint housing 102, shown in a top-down view in FIG. 1. Housing 102 includes a left loudspeaker L in a left side of the housing, a center loudspeaker C in a center of the housing, and a right loudspeaker R in a right side of the housing spaced-apart from each other across a width of the housing (i.e., in the vertical direction in FIG. 1). Housing 102 also includes an omnidirectional microphone M positioned between center loudspeaker C and right loudspeaker R. Microphone M is separated from center loudspeaker C by a distance d and from left loudspeaker L by a distance of approximately 3d. Microphone M converts received audio to a microphone signal (mic. sig.) 104 and provides the microphone signal to a controller of the endpoint (not shown).

Loudspeaker processing 100 includes a left logical audio channel LC, a center logical audio channel CC, and a right logical audio channel RC that, when active, feed left channel audio, center channel audio, and right channel audio to left loudspeaker L, center loudspeaker C, and right loudspeaker R, respectively, through respective gain stages (G) (each depicted as a triangular block). In the ensuing description, a logical audio channel is referred to simply as a "channel." In an example, left and right channels RC and LC may be left and right stereo channels that feed left and right stereo channel audio to left and right loudspeakers L and R. In another example, mono channel audio may feed one or more of center channel CC, left channel LC, and right channel RC. Each gain stage (G) has a gain of "1." In other words, each channel LC, CC, and RC has unity gain.

The left channel audio, the right channel audio, and the center channel audio are solely associated with, and intended for, left loudspeaker L, center loudspeaker C, and right loudspeaker R, respectively. That is, the left channel audio, the right channel audio, and the center channel audio represent respective channelized audio normally intended only for left loudspeaker L, center loudspeaker C, and right loudspeaker R, respectively. In the embodiments presented below, loudspeaker processing using the precedence effect spreads and time-delays the energy of a given audio channel (i.e., channelized audio) normally dedicated to that channel and its corresponding loudspeaker to one or more other channels and corresponding loudspeakers to reduce coupling between the loudspeakers and microphone(s), as described below.

Figure 2:
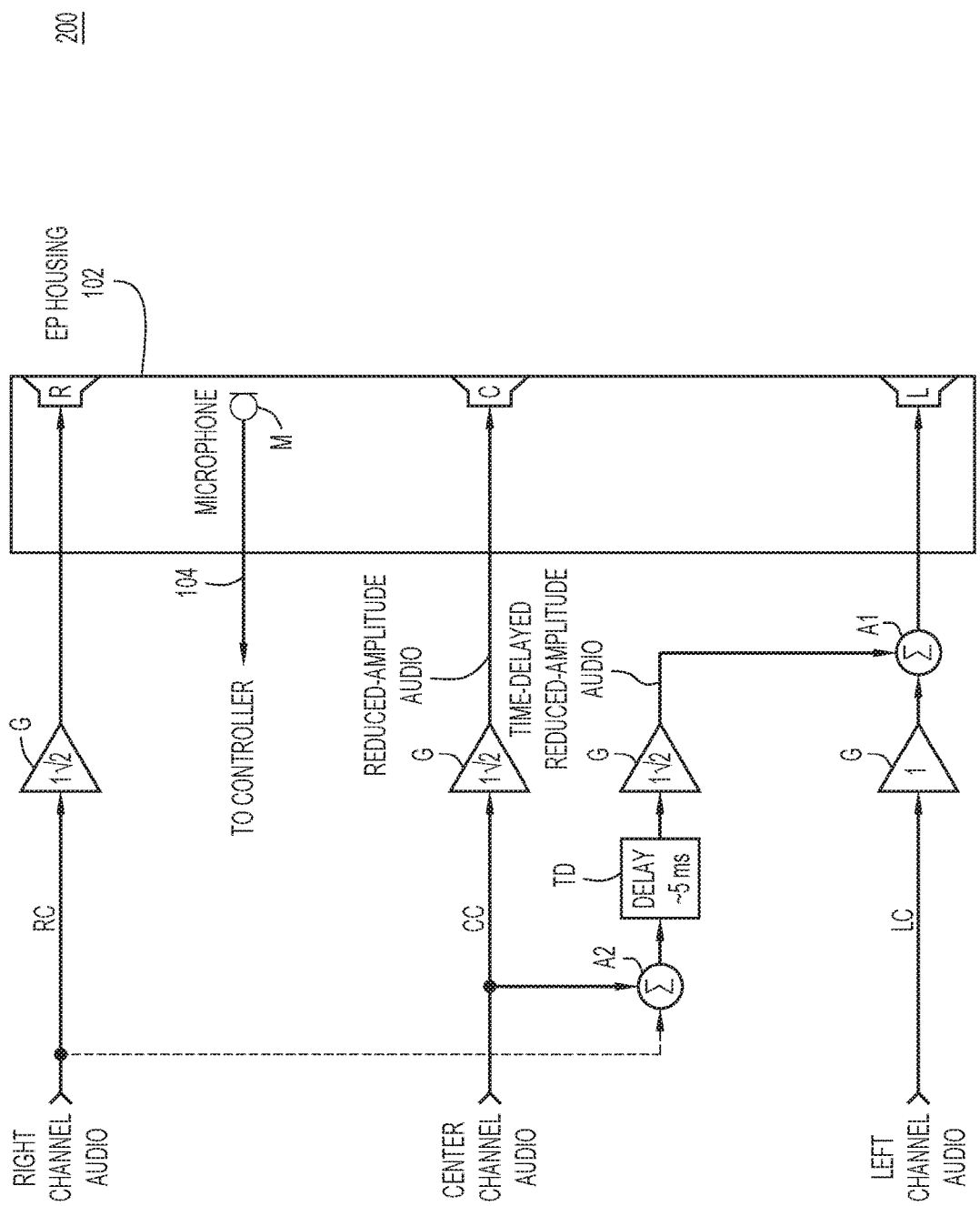
FIG. 2 is an illustration of loudspeaker processing that employs the precedence effect to improve AEC performance, according to an embodiment.

With reference to FIG. 2, there is an illustration of loudspeaker processing 200 that employs the precedence effect to improve on baseline loudspeaker processing 100, according to an embodiment, as is now described. A first use case assumes that center channel CC and center loudspeaker C are active. That is, the center channel audio is to be played through, i.e., used to drive, center loudspeaker C. Because left loudspeaker L is further away from microphone M than loudspeaker R, loudspeaker processing 200 splits the center channel audio equally between center loudspeaker C and left loudspeaker L. That is, loudspeaker processing 200 generates, from the center channel audio input to center channel CC, reduced-amplitude audio, including first reduced-amplitude audio to drive center loudspeaker C and second reduced-amplitude audio for left loudspeaker L. Each reduced-amplitude audio has an amplitude that is less than an amplitude of the center channel audio. In this example, with a gain factor 1/sqrt(2) because of a two-way split, each reduced-amplitude audio has an amplitude that is 3 dB lower than the center channel audio input to center channel CC (this is because 20*log 10(1/sqrt(2))=−3).

To use the precedence effect and ensure that a listener positioned a distance away from the endpoint will perceive sound emitted from loudspeakers L, C, and R as originating from center loudspeaker C, baseline processing 200 additionally includes a time-delay TD to time-delay the second reduced-amplitude audio for left loudspeaker L, to produce time-delayed reduced-amplitude audio, to drive left loudspeaker L. Time delay TD may be approximately 5 ms, which corresponds to a path difference of approximately 1.7 m. As shown in FIG. 2, receive processing 200 may also include a signal adder A1 (prior to left loudspeaker L) to add or sum the time-delayed reduced-amplitude audio to the left channel audio (assuming the left channel audio is present, i.e., when the left channel is also active). The resulting combined or summed audio drives left loudspeaker L. In sum, receive processing 200 spreads the energy of the center channel audio across center loudspeaker C and left loudspeaker L; to do this, receive processing 200 generates from the (input) center channel audio (i) the reduced-amplitude version of the center channel audio to drive center loudspeaker C, and (ii) the time-delayed reduced-amplitude version of the center channel audio to drive left loudspeaker L.

With an example distance d=0.2 m, the arrangement of FIG. 2 yields the following estimated improvement of ENR:

$$20*\log 10(1/d) - 10*\log 10((1/\text{sqrt}(2)*1/d)^2 + (1/\text{sqrt}(2)*11(3*d))^2) = 2.6 \text{ dB}.$$

The improvement in ENR becomes larger as the microphone is moved closer to center loudspeaker C.

A second use case, shown in dashed-line in FIG. 2, assumes that right channel RC and right loudspeaker R are active, i.e., right channel audio is to be played from the right loudspeaker. In this case, instead of using only right loudspeaker R for right channel RC, energy of the right channel audio is split between right channel RC and left channel LC, and time delay TD is retained. A second signal adder A2 (prior to delay TD) sums the center channel audio with the right channel audio. In the second use case, the left channel audio driving left loudspeaker C is un-touched because the left loudspeaker is farthest away from microphone M. ENR may be improved further by increasing the time delay and moving more of the audio energy to left loudspeaker L, i.e., as the Haas effect indicates.

Figure 3:
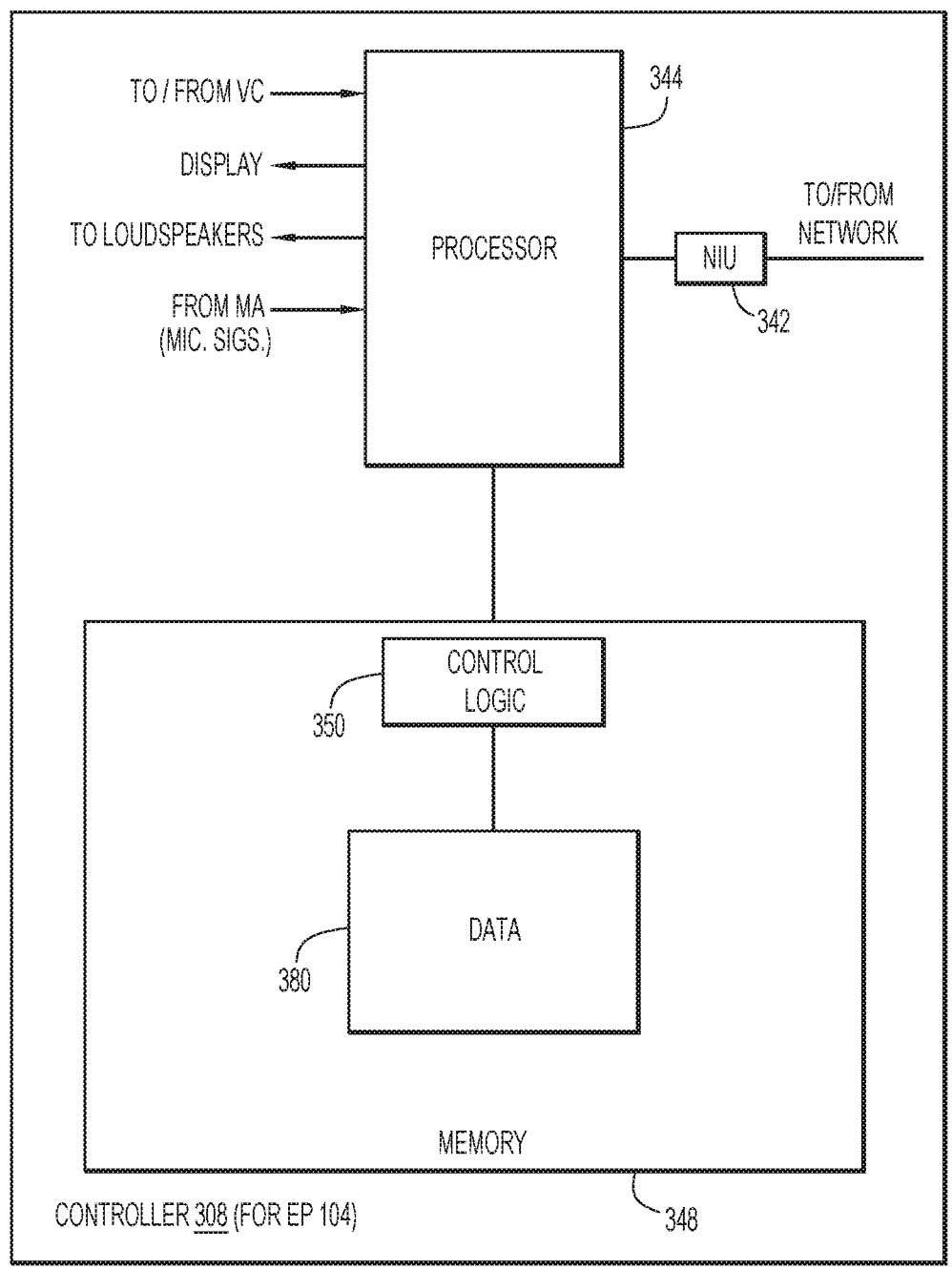
FIG. 3 is a block diagram of a controller of an endpoint configured to perform embodiments directed to loudspeaker processing that employ the precedence effect to improve AEC performance, according to an example embodiment.

Reference is now made to FIG. 3, which is a block diagram of an example controller 308 of an endpoint configured to perform embodiments presented herein, e.g., to implement various configurations of loudspeaker processing using the precedence effect as described herein. There are numerous possible configurations for controller 308 and FIG. 3 is meant to be an example. Controller 308 includes a network interface unit 342, a processor 344, and memory 348. The aforementioned components of controller 308 may be implemented in hardware, software, firmware, and/or a combination thereof. The network interface (I/F) unit (MU) 342 is, for example, an Ethernet card or other interface device that allows the controller 308 to communicate over a communication network. Network I/F unit 342 may include wired and/or wireless connection capability.

Processor 344 may include a collection of microcontrollers and/or microprocessors, for example, each configured to execute respective software instructions stored in the memory 348. The collection of microcontrollers may include, for example: a video controller to receive, send, and process video signals related to a display (not shown) and a video camera (not shown); an audio processor to receive, send, and process audio (i.e., audio signals) related to loudspeakers (not shown) and one or more microphones (not shown); and a high-level controller to provide overall control. Portions of memory 348 (and the instruction therein) may be integrated with processor 344. In the transmit direction, processor 344 processes audio/video captured by a microphone or a microphone array (MA)/video camera (VC), encodes the captured audio/video into data packets, and causes the encoded data packets to be transmitted to communication network. In a receive direction, processor 344 decodes audio/video from data packets received from the communication network and causes the audio/video to be presented to local participant via the loudspeakers/display. As used herein, the terms "audio" and "sound" are synonymous and used interchangeably.

The memory 348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 348 may comprise one or more computer readable storage media (e.g., a memory device) encoded with software comprising computer executable instructions and when the software is executed (by the processor 344) it is operable to perform the operations described herein. For example, the memory 348 stores or is encoded with instructions for control logic 350 perform operations described herein. Control logic 350 may perform microphone array beamforming on microphone signals, and may perform loudspeaker processing as described above and below. In addition, memory 348 stores data 380 used and generated by control logic 350.

Embodiments described below combine in an endpoint the concepts described above with a broadside beamforming microphone array capable of forming different audio receive beams. More specifically, the embodiments dynamically switch between which loudspeakers are being used depending on which audio receive beam is in use, to minimize ENR for each different audio receive beam and moment in time. Such loudspeaker reconfiguration may implemented reasonably seamlessly and inaudibly using a combination of crossfading during typical pauses in speech, and the precedence effect.

With reference to FIGS. 4-7, generally, there are shown four configurations loudspeaker drive processing 400, 500, 600, and 700 (each referred to simply as "loudspeaker processing") using the precedence effect for an endpoint having 2 center loudspeakers and 2 side loudspeakers. Only part of the endpoint is shown in FIGS. 4-7. The endpoint includes a housing 402, which is shown in top-down view. Housing 402 includes a broadside microphone array MA centered in the housing and having microphones M(1)-M(N) spaced-apart from each other along a width of housing 402 (extending in the vertical direction in the figure). Microphones M(1)-M(N) each convert audio received at microphone array MA to corresponding individual microphone signals (mic. sigs.), generally represented at 404, and send the individual microphone signals to controller 308 for processing, including AEC, microphone array beamforming, and so on, in accordance with embodiments presented herein. Housing 402 also include a camera X centered in the housing to capture video of a field facing away from the housing (i.e., in front of/to the right of the housing).

Housing 402 also includes a left loudspeaker L on a left side of housing 402, a center-left loudspeaker C2, a center-right loudspeaker C1, and a right loudspeaker R on a right-side of the housing spaced-apart from each other across the housing. Center-left loudspeaker C2 and center-right loudspeaker C1 (collectively referred to as center loudspeakers C1, C2) are closer to microphone array MA than left loudspeaker L and right loudspeaker R. For example, microphone array MA overlaps positionally with center loudspeakers C1, C2, but does not overlap left and right loudspeakers L, R. Also, center-left loudspeaker C1 is closer to left loudspeaker L than right loudspeaker R, and center-right loudspeaker C1 is closer to the right loudspeaker than the left loudspeaker. Similar to FIG. 2, the endpoint includes channels LC, CC, and RC that, when active, feed left, center, and right channel audio, generally, to left loudspeaker L, one of center loudspeakers C1, C2, and right loudspeaker R, respectively.

Endpoint controller 308 processes the individual microphone signals 404 from microphone array MA to form a directional audio receive beam at the microphone array. The directional audio receive beam has a directional main lobe that points in a desired direction from which audio energy is (mainly) to be received. The directional main lobe has a known beam width. Controller 308 may steer the desired direction of the main lobe in azimuth over a range of angles (e.g., from 0 to 180°) about a main axis extending normally away from a plane of microphone array MA, for example. Any known or hereafter developed technique for audio receive beamforming and beam steering for a microphone array may be used to form the directional audio receive beam as described. In FIGS. 4-7, the main lobe is depicted in dotted-line (and referred to as a "microphone array pickup beam pattern"), and is pointed at an active talker P at different azimuth positions in FIGS. 4-7. Controller 308 knows (i) predetermined positions of loudspeakers L, C1, C2, and R with respect to microphone array MA (which may be stored in memory), (ii) the (azimuth) direction in which the main lobe is pointed (from beamforming processing), and (iii) the width of the main lobe (also from beamforming processing). Accordingly, for any given main lobe direction and main lobe width, controller 308 may determine which of loudspeakers L, C1, C2, and R fall inside/are encompassed by the main lobe, and which are not. Any know or hereafter technique for determining which loudspeakers is/are within the main lobe and which are not within the main lobe may be used. This information is used to configure the loudspeaker (drive) processing for loudspeakers L, C1, C2, and R, as described below in connection with FIG. 4-7.

For loudspeaker processing 400, 500, 600, and 700 using the precedence effect described below, it is assumed that center channel CC and one of center loudspeakers C1, C2 is active. It is also desired that audio (emitted by loudspeakers L, C1, C2, and R) be perceived, by a listener positioned a distance away from the endpoint, to originate from a center of housing 402, e.g., from a position between speakers C1 and C2 that coincides with camera X.

Figure 4:
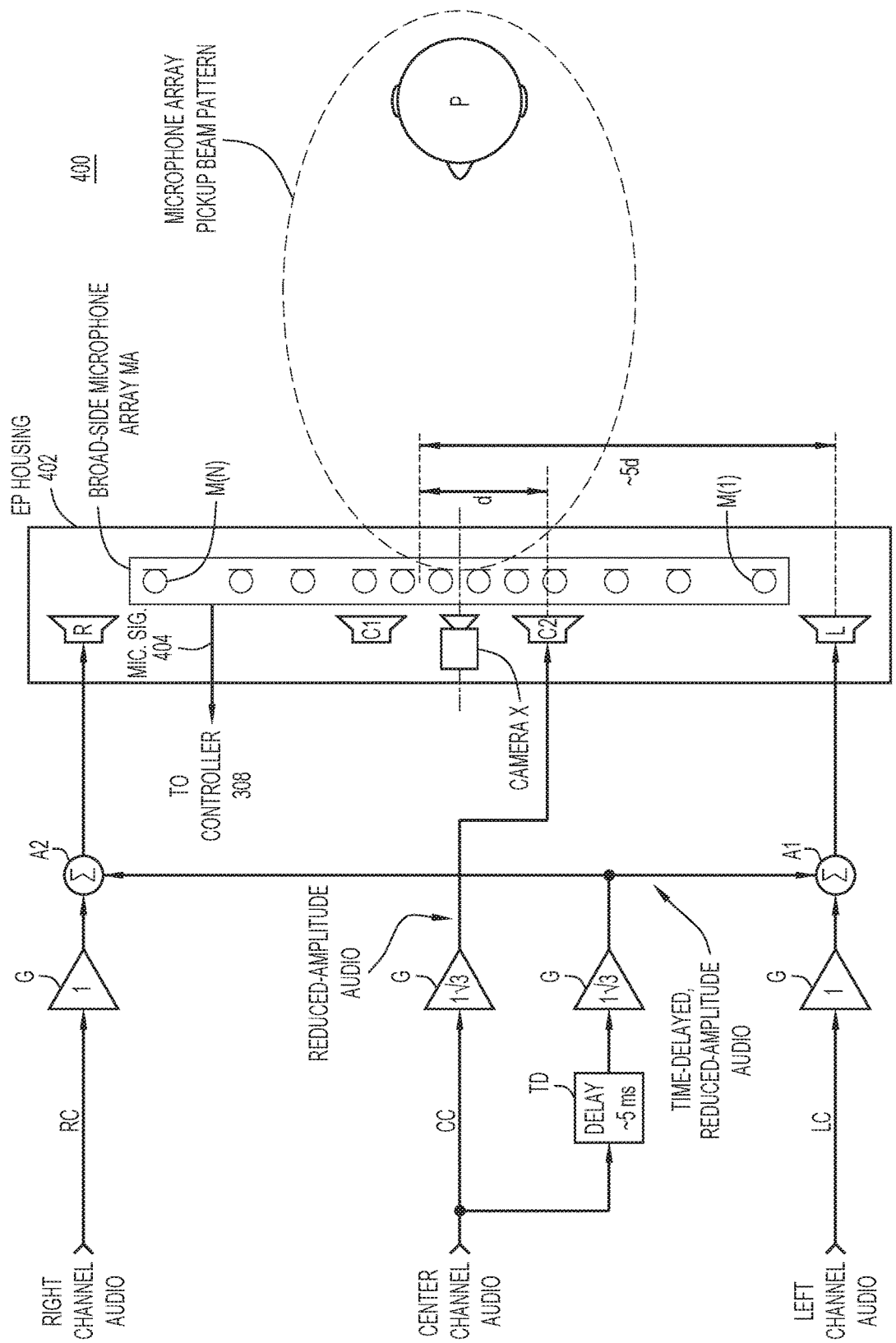
FIG. 4 is an illustration of loudspeaker processing using the precedence effect in an endpoint with two center loudspeakers, a left loudspeaker, and a right loudspeaker, when an audio receive beam is pointed directly forward, according to an example embodiment.

With reference to FIG. 4, there is an illustration of loudspeaker processing 400 for a case in which active talker P is front and center with respect to microphone array MA, and the main lobe points to the active talker directly so that neither left-speaker L nor right speaker R are inside the main lobe, and center loudspeakers C1, C2 are both not inside the main lobe. For this case, loudspeaker processing 400 splits audio energy of the (input) center channel audio (where center channel CC is assumed to be the most commonly used channel) over the three loudspeakers L, C2, and R, to move audio energy away from central or inner microphones of microphone array MA, which boosts AEC performance. The audio emitted from loudspeakers L, C2, and R will be perceived, at any listener location in the room outside of the nearfield of the endpoint, to arrive/originate from loudspeaker C2, closest to camera X; that is, loudspeaker processing 400 makes the perceived sound location origin be that of C2 at any listener location outside the nearfield of the endpoint, not only at the active talker P position.

More specifically, as shown in FIG. 4, loudspeaker processing 400 generates from the center channel audio (i) reduced-amplitude audio that drives loudspeaker C2, (ii) first time-delayed reduced-amplitude audio to drive left loudspeaker L, and (ii) second time-delayed reduced-amplitude audio to drive right loudspeaker R. In this example, with a gain factor 1/sqrt(3) because of a three-way split, each reduced-amplitude audio has an amplitude that is less than the center channel audio input to center channel CC. Also, left and right channel adders A1, A2 may be employed to add the time-delayed reduced-amplitude audio to respective ones of the left channel audio and the right channel audio when the right loudspeaker and the left loudspeaker are active, to produce summed left channel audio and summed right channel audio to drive left loudspeaker L and right loudspeaker R, respectively, as shown.

Figure 5:
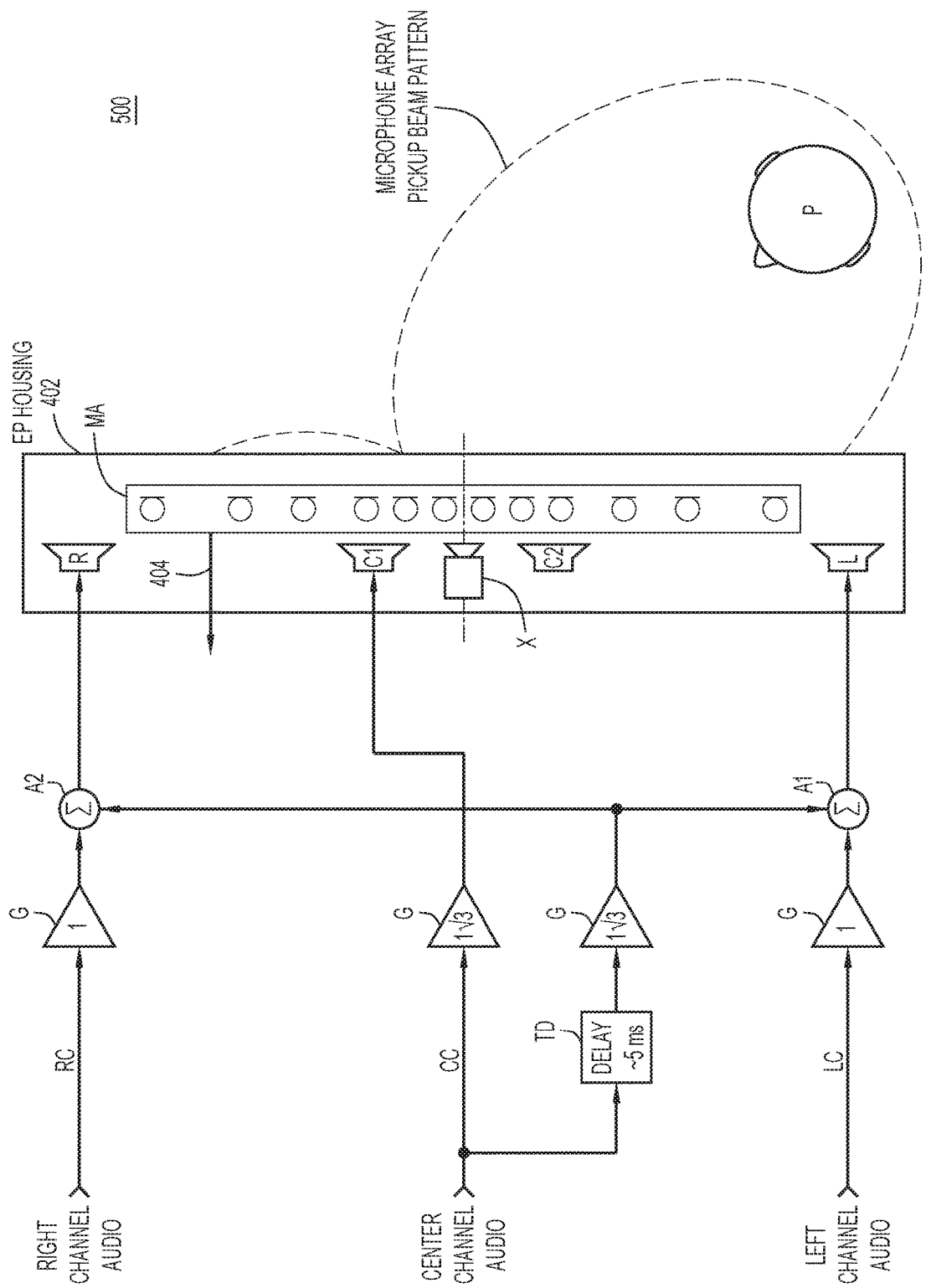
FIG. 5 is an illustration of loudspeaker processing using the precedence effect in the endpoint with the two center loudspeakers when a center-left one of the two center loudspeakers is inside the audio receive beam, according to an example embodiment.

With reference to FIG. 5, there is an illustration of loudspeaker processing 500 using the precedence effect for a case in which active talker P is in front of center-left loudspeaker C2, and the main lobe is shifted slightly to the left of center to point to the active talker so that only center-left loudspeaker C2 is considered inside the main lobe. For this case, loudspeaker processing 500 splits the audio energy similarly to the way loudspeaker processing 400 splits the audio energy, except that the reduced-amplitude audio drives center-right loudspeaker C1 instead of center-left loudspeaker C2. Center-right loudspeaker C1 is closer to the center/inner microphones of microphone array MA; nevertheless, center-right loudspeaker C1 is a better choice than center-left loudspeaker C2 because audio emitted from center-right loudspeaker C1 benefits from more suppression by the beamforming process compared to audio emitted from center-left loudspeaker C2.

In a case that is a mirror image to that shown in FIG. 5, active talker P is in front of center-right loudspeaker C1 not center-left loudspeaker C2, and the main lobe is shifted slightly to the right of center to point to the active talker so that only center-right loudspeaker C1 is considered inside the main lobe. The loudspeaker processing in this case is a mirror image to that of loudspeaker processing 500, i.e., the reduced-amplitude audio that is not time-delayed drives center-left loudspeaker C2 instead of center-right loudspeaker C1.

Figure 6:
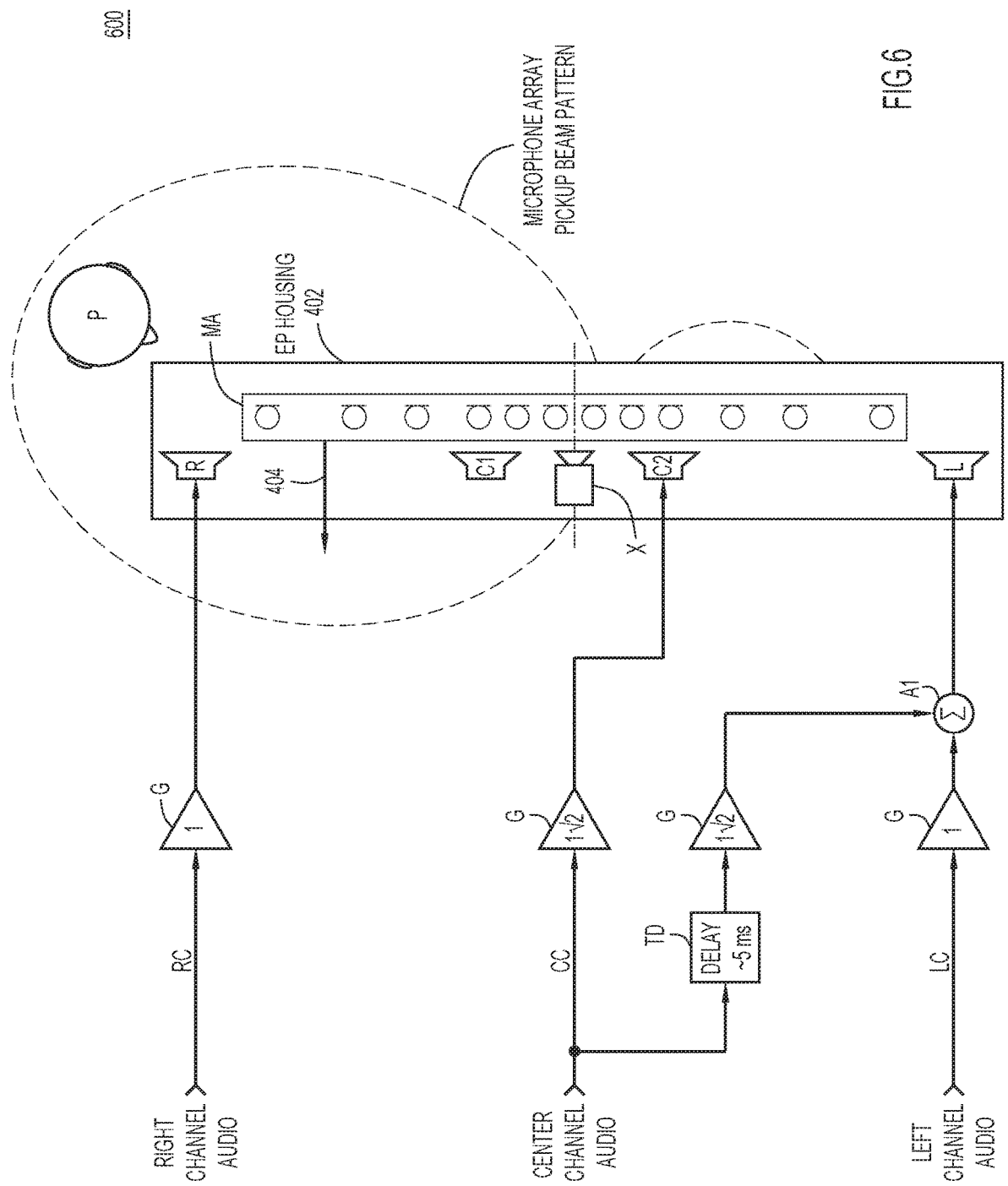
FIG. 6 is an illustration of loudspeaker processing using the precedence effect in the endpoint with the two center loudspeakers when the right loudspeaker is inside the audio receive beam, according to an example embodiment.

With reference to FIG. 6, there is an illustration of loudspeaker processing 600 for a case in which active talker P has moved to the right side of housing 402 adjacent right loudspeaker R, and microphone array MA operates in an end-fired configuration to point the main lobe at the active talker to capture audio from the active talker. In this case, only right loudspeaker R and center-right loudspeaker C1 are inside the main lobe. Loudspeaker processing 600 spreads the energy of/splits the center channel audio across only center-left loudspeaker C2 and left loudspeaker L. That is, loudspeaker processing 600 generates from the center channel audio reduced-amplitude audio to drive center-left loudspeaker C2, and time-delayed reduced-amplitude audio to drive left loudspeaker L. In addition, loudspeaker processing 600 includes adder A1 to sum the time-delayed reduced-amplitude audio with the left channel audio when the left loudspeaker is also active, to produce combined or summed left channel audio to drive left loudspeaker L.

Figure 7:
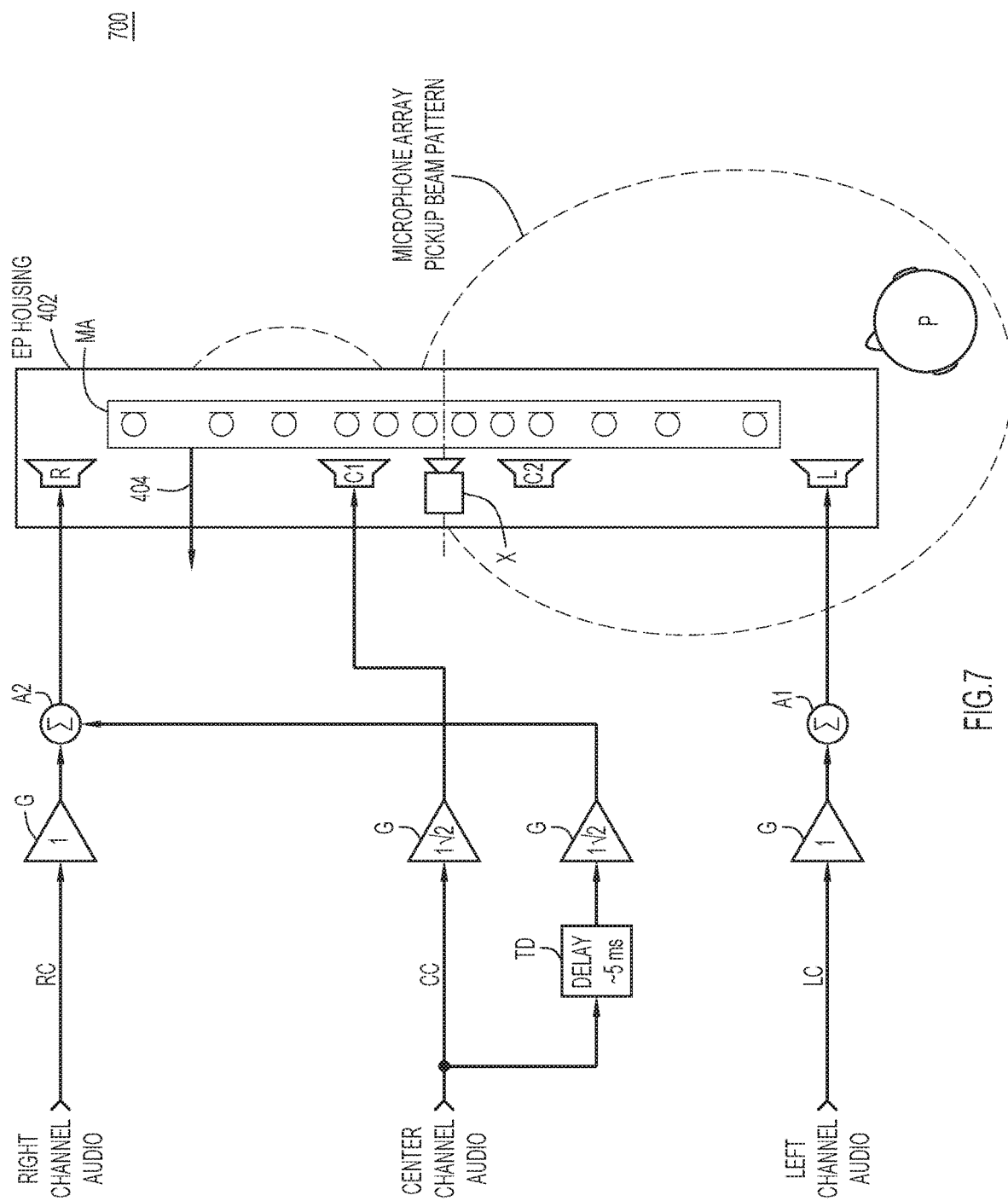
FIG. 7 is an illustration of loudspeaker processing using the precedence effect in the endpoint with the two center loudspeakers when the left loudspeaker is inside the audio receive beam, according to an example embodiment.

With reference to FIG. 7, there is an illustration of loudspeaker processing 700 using the precedence effect for a case that is a mirror image to that shown in FIG. 6, i.e., in which active talker P has moved to the left side of housing 402 adjacent left loudspeaker L, and microphone array MA operates in an end-fired configuration to point the main lobe at the active talker to capture audio from the active talker. In this case, only left loudspeaker L and center-left loudspeaker C2 are inside the main lobe. Loudspeaker processing 700 spreads energy of/splits the center channel audio across only center-right loudspeaker C1 and right loudspeaker R. That is, loudspeaker processing 700 generates from the center channel audio reduced-amplitude audio to drive center-right loudspeaker C1, and time-delayed reduced-amplitude audio to drive right loudspeaker R. In addition, loudspeaker processing 700 includes adder A2 to sum the time-delayed reduced-amplitude audio with the right channel audio when the right loudspeaker is active, to produce combined or summed right channel audio to drive right loudspeaker R.

Figure 8:
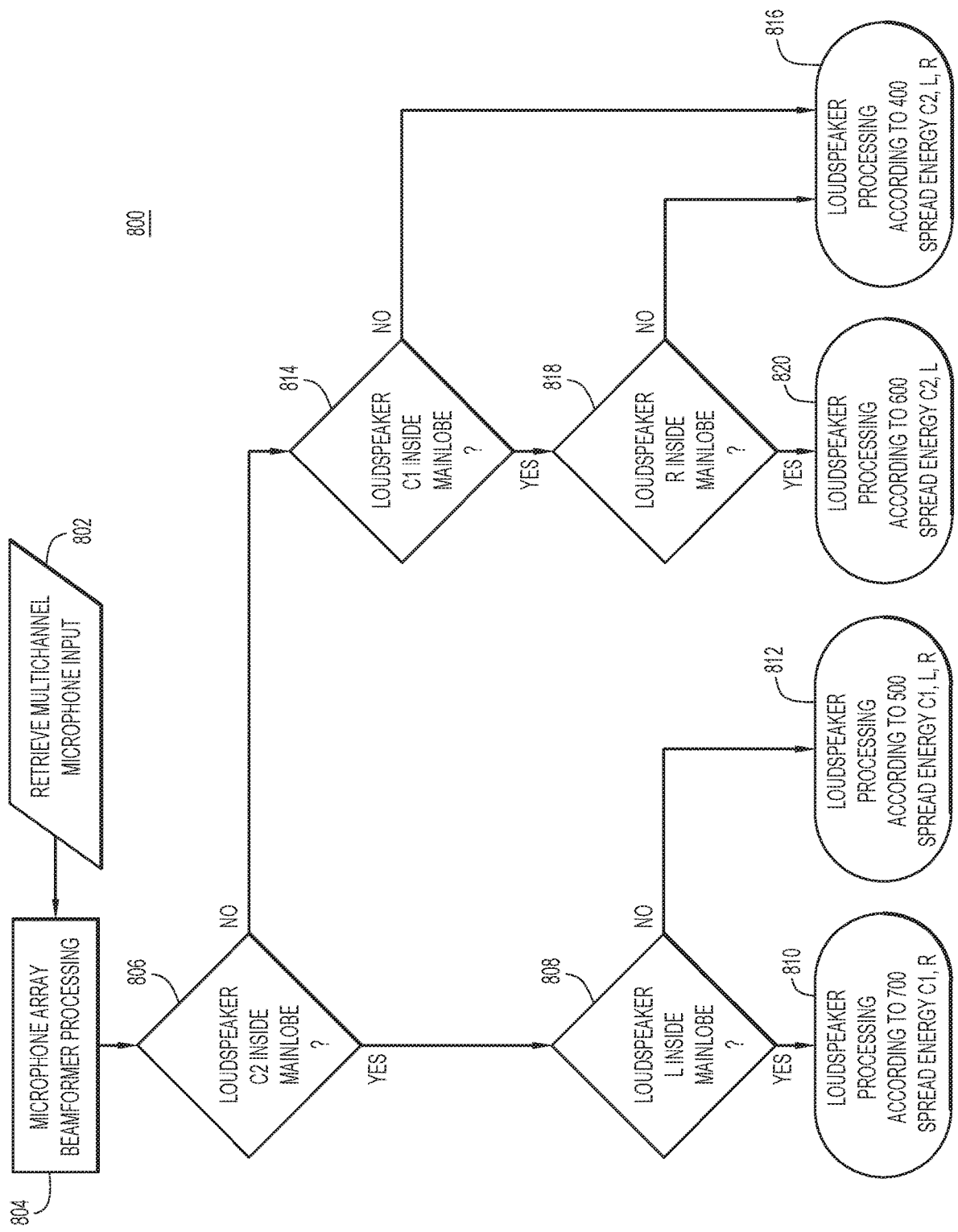
FIG. 8 is a flowchart of a method of performing loudspeaker processing using the precedence effect based on the loudspeaker processing of FIGS. 4-7.

With reference to FIG. 8, there is a flowchart of an example method 800 of performing loudspeaker processing using the precedence effect based on loudspeaker processing 400, 500, 600, and 700, performed primarily by controller 308.

At 802, controller 308 receives/retrieves multichannel microphone input, i.e., the controller receives the individual microphone signals 404 from the microphones of microphone array MA. At 804, controller 308 performs microphone array beamforming based on the individual microphone signals to form an audio receive beam having a main lobe pointing in a known direction.

At 806, controller 308 determines whether center-left loudspeaker C2 is inside the main lobe. If center-left loudspeaker C2 is inside the main lobe, flow proceeds to 808. At 808, controller 308 determines whether left loudspeaker L is inside the main lobe. If left loudspeaker L is inside the main lobe, flow proceeds to 810, where controller 308 implements loudspeaker processing 700 to spread the energy of the center channel audio across center-right loudspeaker C1 and right loudspeaker R. If left loudspeaker L is not inside the main lobe, flow proceeds to 812, where controller 308 implements loudspeaker processing 500 to spread the energy of the center channel audio across center-right loudspeaker C1, left loudspeaker L, and right loudspeaker R.

If center-left loudspeaker C2 is not inside the main lobe, flow proceeds to 814. At 814, controller 308 determines whether center-right loudspeaker C1 is inside the main lobe. If center-right loudspeaker C1 is not in the main lobe, flow proceeds to 816. At 816, controller 308 implements loudspeaker processing 400 to spread the energy of the center channel audio across center-left loudspeaker C2, left loudspeaker L, and right loudspeaker R.

If center-right loudspeaker C1 is inside the main lobe, flow proceeds to 818. At 818, controller 308 determines whether right loudspeaker R is inside the main lobe. If yes, flow proceeds to 820, where controller 308 implements loudspeaker processing 600 to spread the energy of the center channel audio across center-left loudspeaker C2 and left loudspeaker L. If no, flow proceeds to 816, where controller 308 implements loudspeaker processing 400 to spread the energy of the center channel audio across center-left loudspeaker C2, left loudspeaker L, and right loudspeaker R.

Over time, controller 308 may transition or switch between different loudspeaker ones of loudspeaker processing 400, 500, 600, and 700, as the talker P moves around in front of the endpoint (or, in a room including several potential talkers, the active talker changes) and the audio receive beam adapts accordingly. Rather than abruptly transition or switch between one loudspeaker processing configuration and the next, controller 308 may implement audio energy cross-fading across appropriate ones of loudspeakers L, R, C1, and C2 over a short period of time during the transition, to improve a listening experience. For example, during a transition from loudspeaker processing 600 to loudspeaker processing 700, controller 308 may gradually reduce down to zero the amount of audio energy of the center channel audio that is initially spread to loudspeaker L in loudspeaker processing 600, and at the same time gradually increase from zero the amount of audio energy of the center channel audio that is finally spread to loudspeaker R in loudspeaker processing 700. The cross-fading may occur during silent frames between active speech, for example.

With reference to FIGS. 9-12, generally, there are shown four configurations of loudspeaker processing 900, 1000, 1100, and 1200 using the precedence effect for an endpoint having a single center loudspeaker C instead of two center loudspeakers C1, C2. Only part of the endpoint is shown in FIGS. 9-12. Loudspeaker processing 900, 1000, 1100, and 1200 are similar, and simplified with respect to loudspeaker processing 400, 500, 600, and 700, respectively, due to the omission of one of the center loudspeakers. Specifically, for FIGS. 9-12, the endpoint includes a housing 502 that is the same as housing 402, i.e., contains the same hardware components as housing 402, except that housing 502 includes only one center loudspeaker C. For FIGS. 9-12, it is assumed that at least the single center loudspeaker is active.

Figure 9:
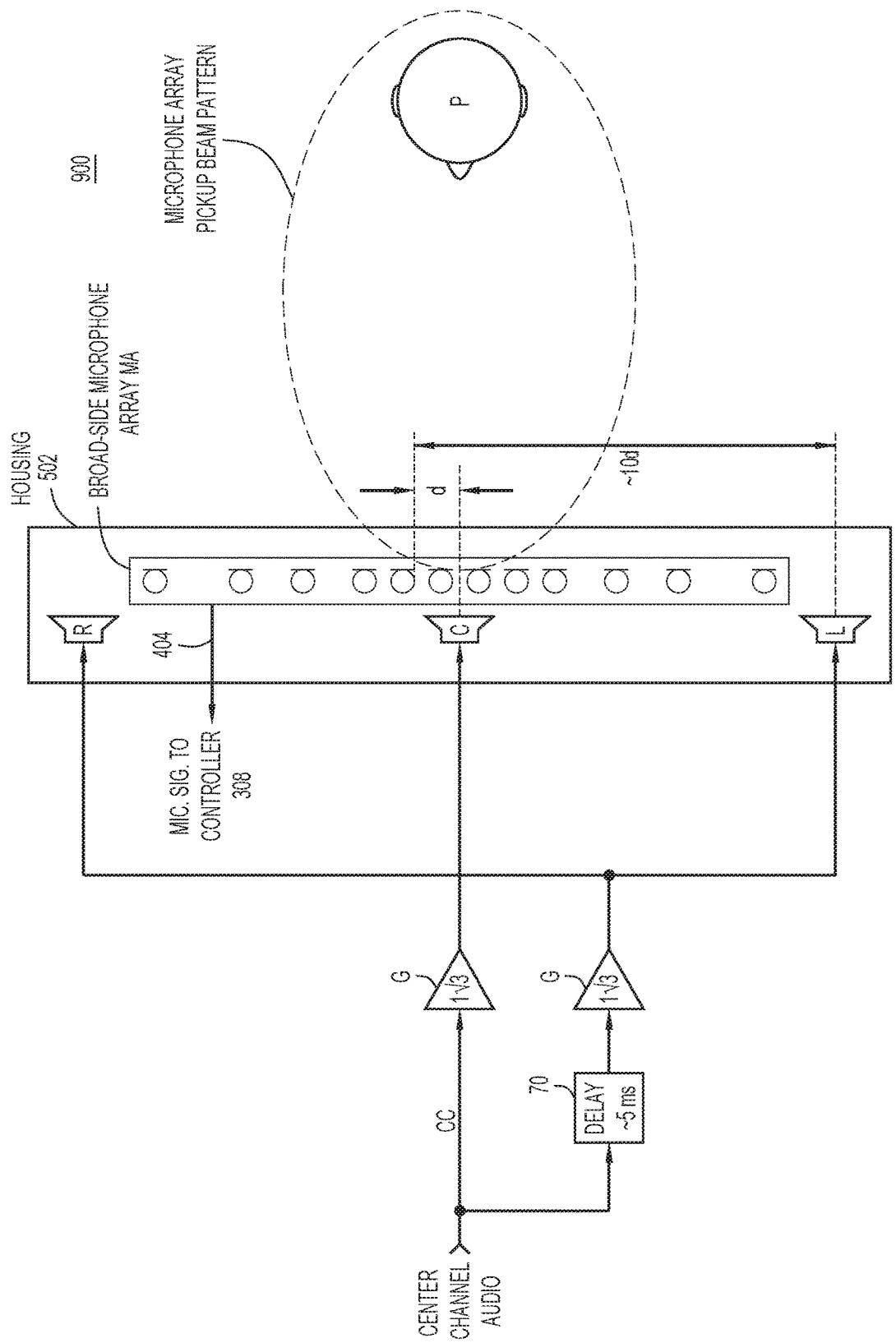
FIG. 9 is an illustration of loudspeaker processing using the precedence effect in an endpoint with a single center loudspeaker, a left loudspeaker, and a right loudspeaker, when an audio receive beam is pointed directly forward, according to an example embodiment.

With reference to FIG. 9, there is an illustration of loudspeaker processing 900 for a case in which active talker P is front and center with respect to microphone array MA, and the main lobe points to the active talker so that left loudspeaker L, right loudspeaker R, and center speaker C are not inside the main lobe. For this case, loudspeaker processing 400 spreads audio energy of the center channel audio over the three loudspeakers L, C, and R, to move audio energy away from microphone array MA. That is, loudspeaker processing generates a reduced-amplitude version of the center channel audio to drive center loudspeaker C, a time-delayed reduced-amplitude version of the center channel audio to drive left loudspeaker L, and a time-delayed reduced-amplitude version of the center channel audio to drive right loudspeaker R. Because the left and right channels are not independently active (i.e., are not providing individual left and right channel audio to respective left and right loudspeakers L, R), there is no need to sum the spread center channel audio energy with left and right channel audio.

Figure 10:
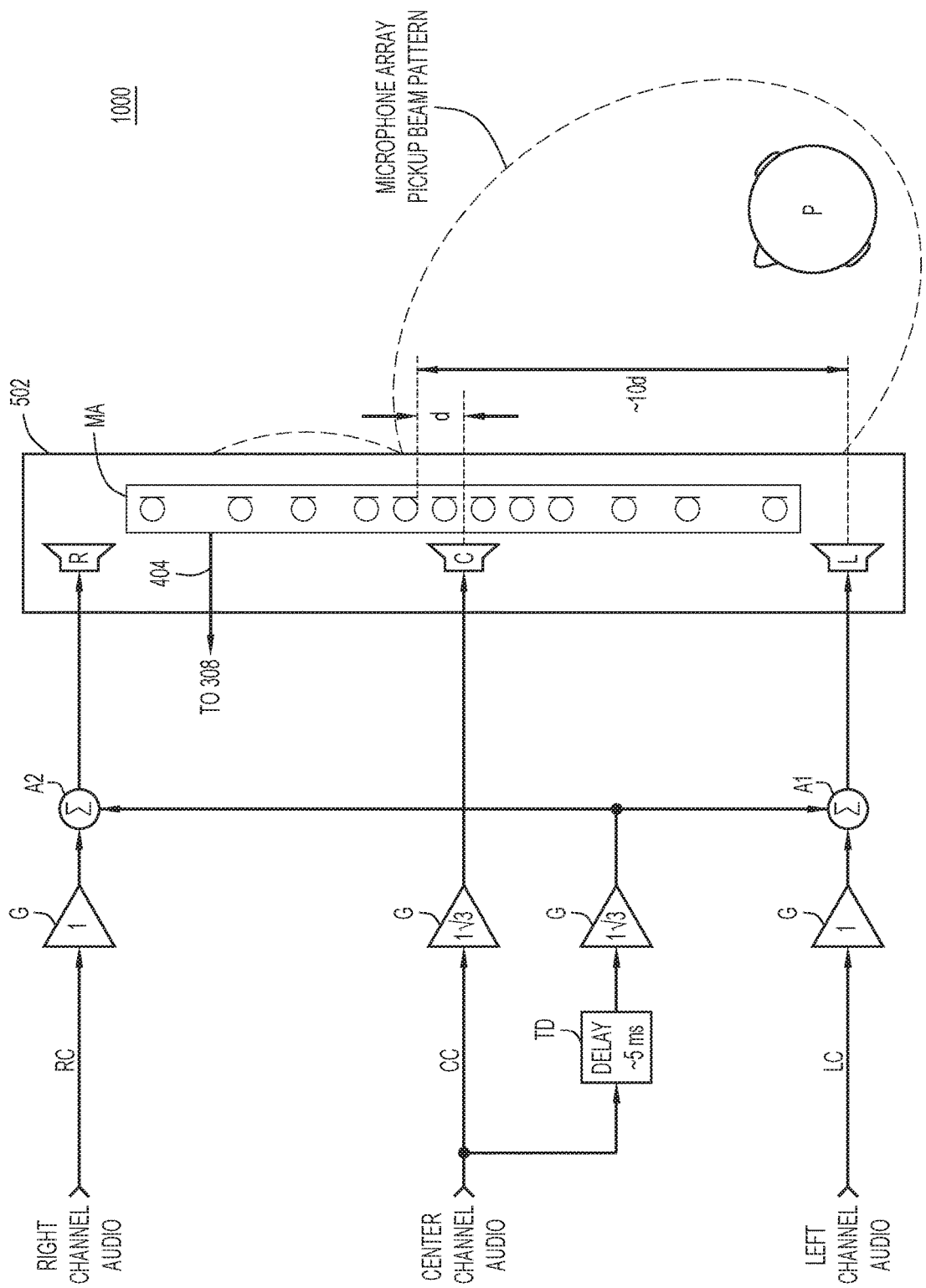
FIG. 10 is an illustration of loudspeaker processing using the precedence effect in the endpoint with the single center loudspeaker when the audio receive beam is pointed slightly toward the left loudspeaker, according to an example embodiment.

With reference to FIG. 10, there is an illustration of loudspeaker processing 1000 for a case in which active talker P is in front, but shifted to the left side, of center loudspeaker C, and the main lobe points to the active talker, and the left, center, and right loudspeakers L, C, and R are still not inside the main lobe. For this case, loudspeaker processing 1000 is the same as that for loudspeaker processing 900. That is, loudspeaker processing 1000 spreads the energy of the center channel audio across all three loudspeakers L, C, and R, to move audio energy away from microphone array MA. In this case, the left and right channels are independently active (i.e., providing individual left and right channel audio to respective left and right loudspeakers L, R). Thus, loudspeaker processing 1000 includes adders A1, A2 to add the time-delayed amplitude-reduced versions of the center channel audio to the left and right channel audio, as shown.

Figure 11:
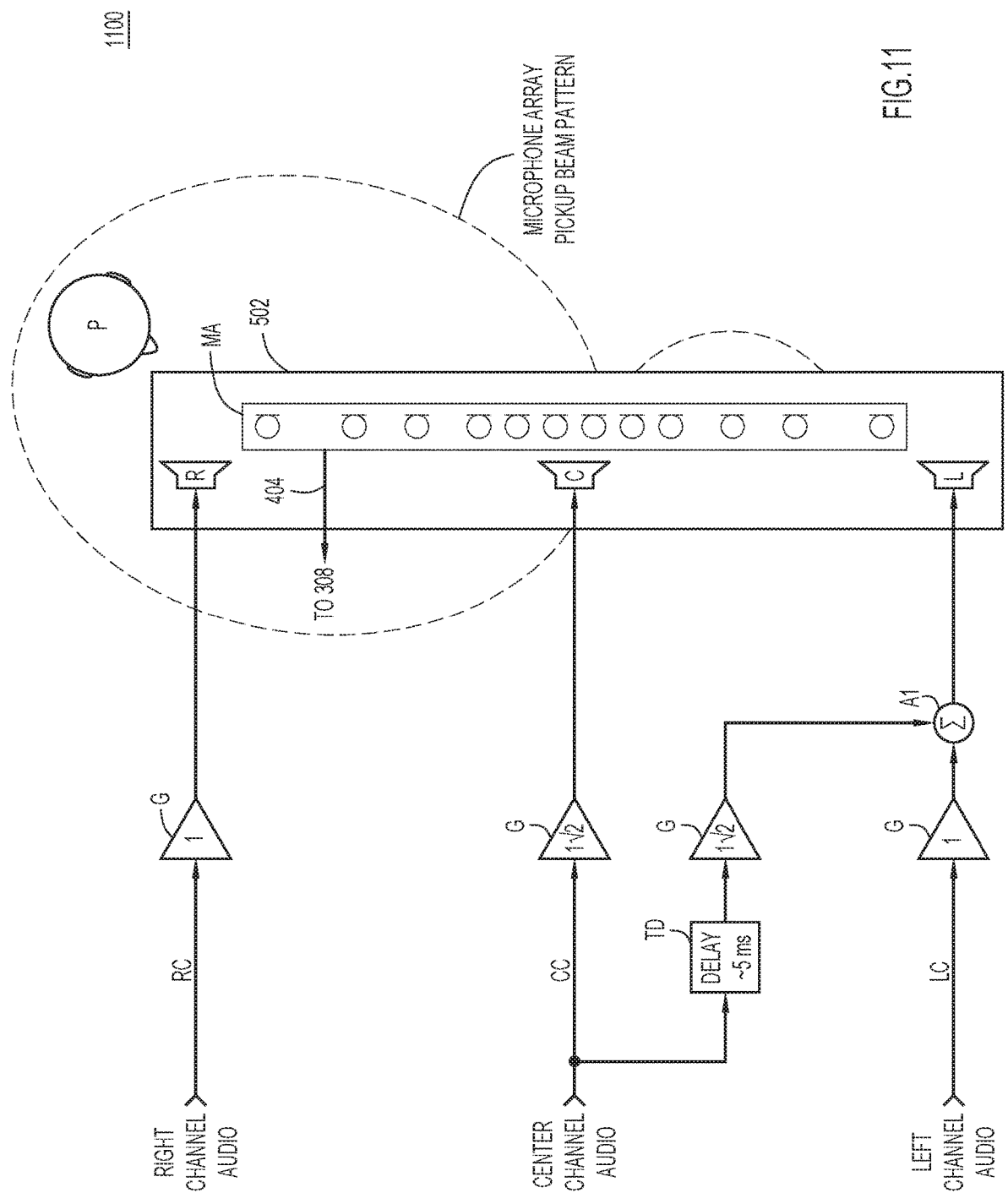
FIG. 11 is an illustration of loudspeaker processing using the precedence effect in the endpoint with the single center loudspeaker when the right loudspeaker is inside the audio receive beam, according to an example embodiment.
Figure 12:
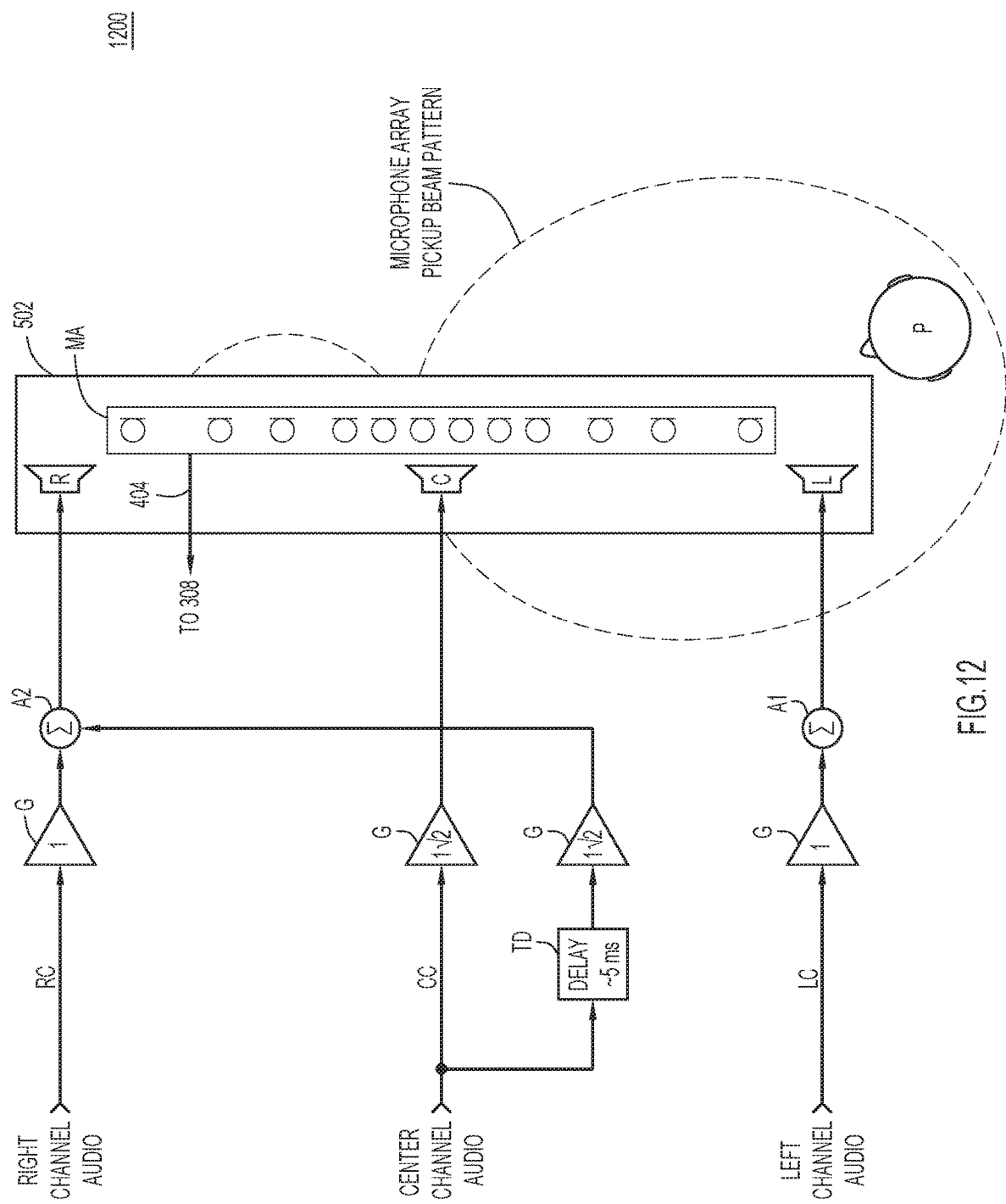
FIG. 12 is an illustration of loudspeaker processing using the precedence effect in the endpoint with the single center loudspeaker when the left loudspeaker is inside the audio receive beam, according to an example embodiment.

With reference to FIG. 11, there is an illustration of loudspeaker processing 1100 for a case in which active talker P has moved to the right side of housing 502 adjacent right loudspeaker R, and microphone array MA operates in an end-fired configuration to point the main lobe at the active talker to capture audio from the active talker. In this case, only right loudspeaker R is inside the main lobe. Loudspeaker processing 1100 spreads the energy of the center channel audio across only center loudspeaker C and left loudspeaker L. Loudspeaker processing 1100 also includes adder A1 to add the spread energy to the left channel audio because the left channel is also active.

With reference to FIG. 1200, there is an illustration of loudspeaker processing 1200 for a case in which active talker P has moved to the left side of housing 502 adjacent left loudspeaker R, and microphone array MA operates to point the main lobe such that only right loudspeaker R is inside the main lobe. Loudspeaker processing 1200 spreads the energy of the center channel audio across only center loudspeaker C and right loudspeaker R. Loudspeaker processing 1100 also includes adder A1 to add the spread energy to the right channel audio because the right channel is now active.

Figure 13:
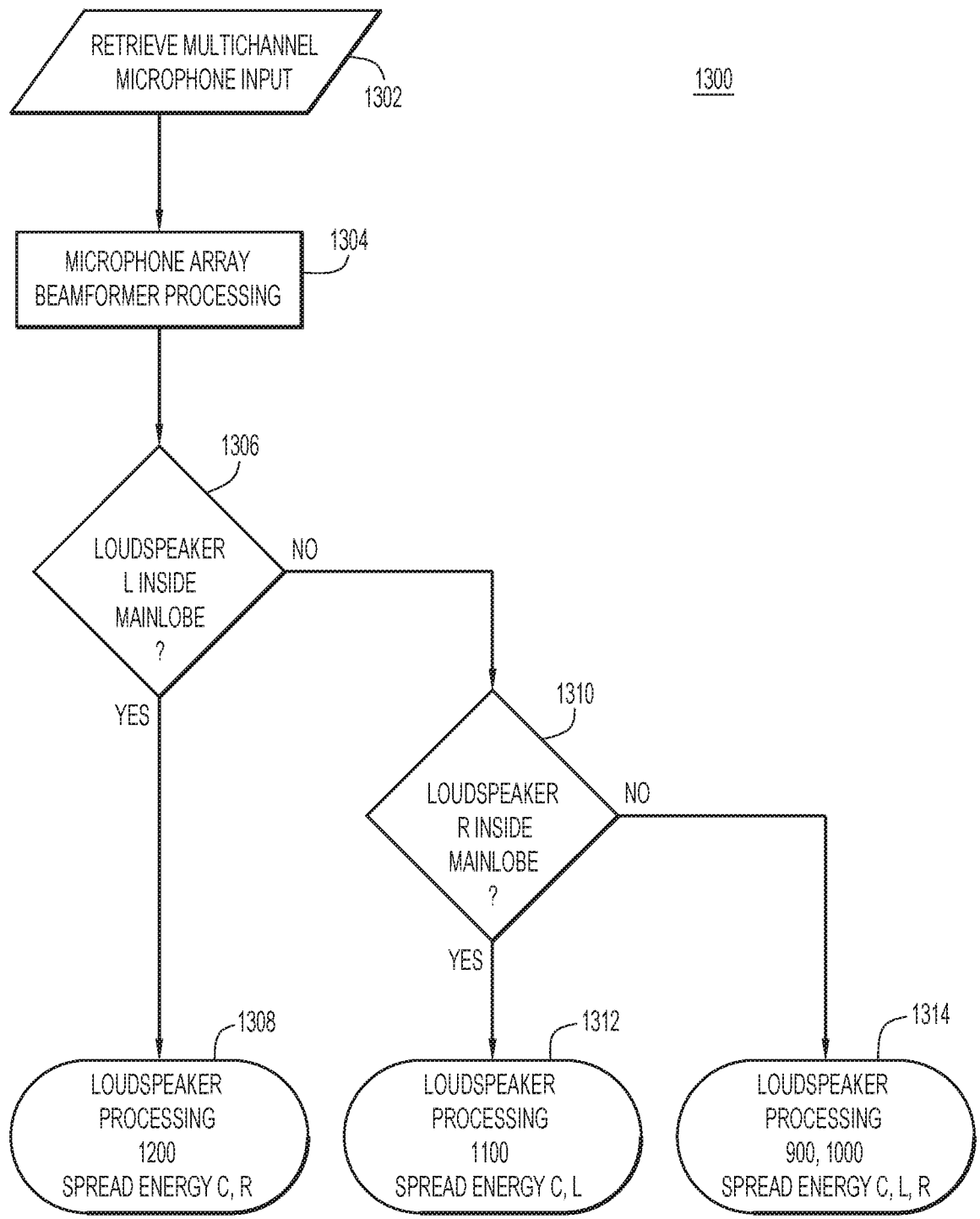
FIG. 13 is a flowchart of a method of performing loudspeaker processing using the precedence effect based on the loudspeaker processing of FIGS. 9-12, according to an example embodiment.

With reference to FIG. 13, there is a flowchart of a method 1300 of performing loudspeaker processing using the precedence effect based on loudspeaker processing 900, 1000, 1100, and 1200, performed primarily by controller 308.

At 1302 and 1304, controller 308 receives/retrieves individual microphone signals 404 and performs microphone array beamforming to form an audio receive beam having a main lobe pointing in a known direction.

At 1306, controller 308 determines whether left loudspeaker L is inside the main lobe. If the left loudspeaker L is inside the main lobe, flow proceeds to 1308, where controller 308 implements loudspeaker processing 1200 to spread the energy of the center channel audio across only center loudspeaker C and right loudspeaker R.

If left loudspeaker C is not inside the main lobe, flow proceeds to 1310. At 1310, controller 308 determines whether the right loudspeaker R is inside the main lobe. If yes, flow proceeds to 1312, where controller 308 implements loudspeaker processing 1100 to spread the energy of the center channel audio across only center loudspeaker C and left loudspeaker L. If no, flow proceeds to 1314, where controller 308 implements loudspeaker processing 900 to spread the energy of center channel audio across all of loudspeakers L, C, and R.

Figure 14:
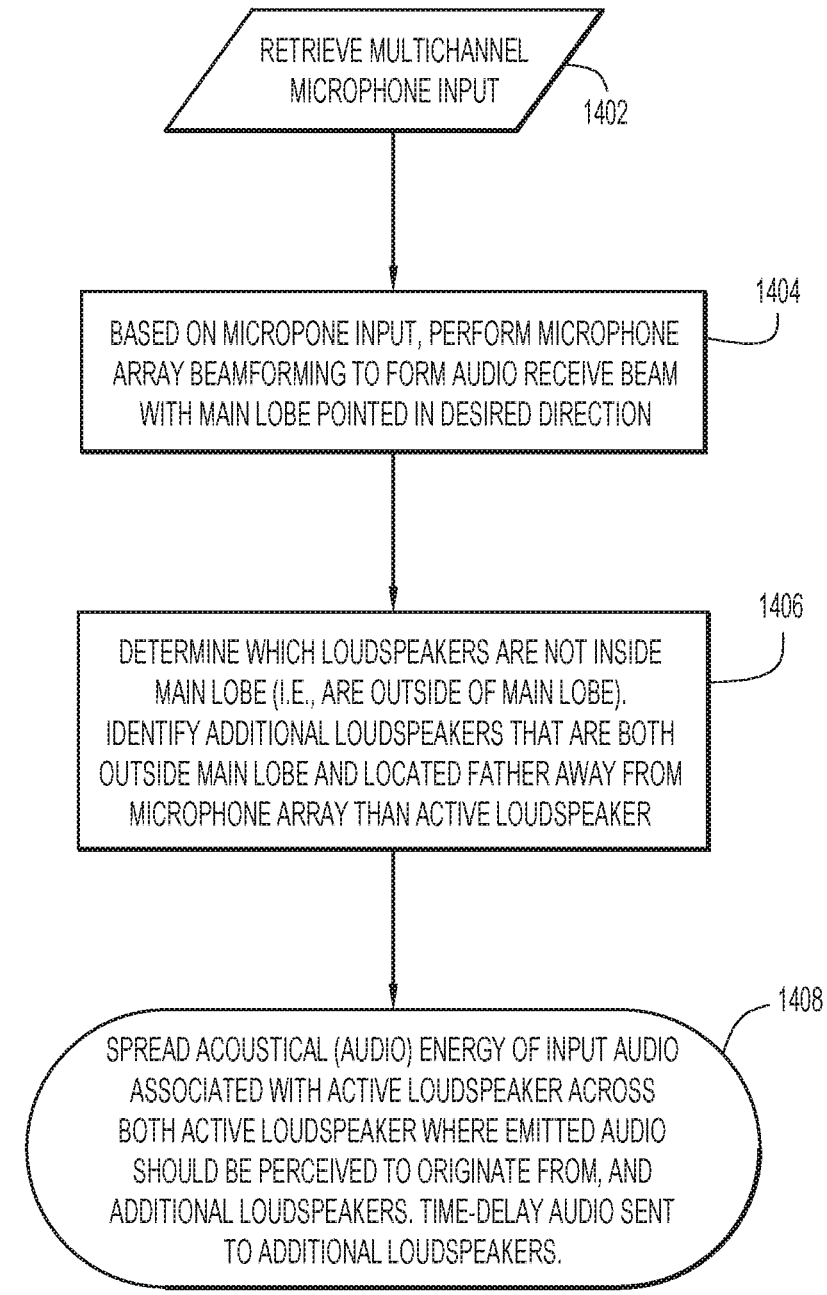
FIG. 14 is a flowchart of a generalized method of performing loudspeaker processing using the precedence effect, according to an example embodiment.

With reference to FIG. 14, there is a flowchart of an example generalized method 1400 of loudspeaker processing performed primarily by controller 308 in an endpoint including multiple spaced-apart loudspeakers and a microphone array. Method 1400 assumes an active loudspeaker positioned closest to the microphone array among the loudspeakers. That is, there is audio (referred to as "input audio") associated with, and intended for, the active loudspeaker. It is also desired that audio emitted by the active loudspeaker be perceived, by a listener positioned a distance away from the endpoint, to originate from the position of the active speaker (closest to the microphone array).

At 1402, controller 308 receives/retrieves multichannel microphone input and performs microphone array beamforming on the multichannel microphone input to form an audio receive beam having a main lobe pointed in a known direction from which audio is received at the microphone array, e.g., from an active talker.

At 1404, controller 308 determines which of the loudspeakers are not inside (i.e., not "in") the main lobe. To do this, controller 308 may determine which of the loudspeakers are in the main lobe, and deduce that other ones of the loudspeakers are not in the main lobe. Armed with the knowledge of which of the loudspeakers are not in the main lobe (and thus which are in the main lobe), controller 308 identifies any (i.e., at least one) additional loudspeakers (i.e., additional to the active loudspeaker) among the loudspeakers that are both (i) determined not to be in the main lobe, and (ii) farther away from the microphone array than the active loudspeaker.

In conventional loudspeaker processing, as shown in FIG. 1, for example, the input audio (i.e., audio energy of the input audio) remains dedicated to the active speaker associated with the input audio. In contrast, to leverage the precedence effect, at 1406, controller 308 spreads the audio energy of the input audio across the active loudspeaker (i.e., the loudspeaker from which emitted audio should be perceived to originate from) and each of the additional loudspeakers, and no other ones of the loudspeakers. To do this, controller 308 generates from the input audio reduced-amplitude audio and time-delayed reduced-amplitude audio. Controller 308 drives the active loudspeaker with the reduced-amplitude audio and drives the additional loudspeakers with the time-delayed reduced-amplitude audio. This approach uses the precedence effect to reduce coupling of sound energy emitted by the active loudspeaker and the additional loudspeakers to the microphone array.

When controller 308 switches from a first audio receive beam having a first main lobe pointed in a first direction to a second audio receive beam having a second main lobe pointed in a second direction different from the first direction, the controller repeats the operations to determine, identify, and spread described above for the first main lobe and the second main lobe. When the identify operation identifies a first additional loudspeaker for the first main lobe and a second additional loudspeaker different from the first additional loudspeaker for the second main lobe, controller 308 transitions from the spreading for the first main lobe to the spreading for the second main lobe as follows: during the transition, the controller cross-fades over a time period the audio energy from the first additional loudspeaker to the second additional loudspeaker (assuming the first additional loudspeaker is not needed for a precedence effect in connection with the second main lobe).

By way of example, endpoint configurations presented above employ a microphone array positioned in a center of an endpoint housing and that coincides positionally with (i.e., is closest to) one or more center loudspeakers, which may be active loudspeakers. Other configurations include a microphone array positioned on a side of the endpoint array to coincide positionally with a left or a right speaker, which may be the active speaker. In the latter configurations, the one or more center speakers may remain, or may be omitted. The techniques presented herein apply equally to all of the aforementioned configurations.

In summary, embodiments leverage the precedence effect inside the human auditory system to improve the acoustical echo cancellation performance in collaboration endpoints. The embodiments are relatively inexpensive and straightforward to implement, make it easier to combine directional audio loudspeakers and beamforming microphone arrays in an endpoint In summary, in one form, a method is provided comprising: at an endpoint device including a microphone array and spaced-apart loudspeakers including an active loudspeaker that is closest to the microphone array among the loudspeakers: forming at the microphone array an audio receive beam having a main lobe pointed in a direction from which audio is to be received; determining which of the loudspeakers are not in the main lobe; identifying at least one additional loudspeaker among the loudspeakers determined not to be in the main lobe and that is farther away from the microphone array than the active loudspeaker; and spreading audio energy of input audio associated with, and intended for, the active loudspeaker across the active loudspeaker and the at least one additional loudspeaker, and no other ones of the loudspeakers, to reduce coupling of sound energy emitted by the active loudspeaker and the at least one additional loudspeaker to the microphone array based on a precedence effect.

In another form, a method is provided comprising: at an endpoint device including a microphone array and spaced-apart loudspeakers including side loudspeakers and center loudspeakers positioned between the side loudspeakers and closer to the microphone array than the side loudspeakers: forming at the microphone array an audio receive beam having a main lobe pointing in a direction from which audio is to be received; determining which of the center loudspeakers and the side loudspeakers are in the main lobe; and based on results of the determining, spreading audio energy of input audio associated with, and intended for, the center loudspeakers across only one of the center loudspeakers and at least one of the side loudspeakers, to reduce coupling of sound energy emitted by the one of the center loudspeakers and the at least one of the side loudspeakers to the microphone array based on a precedence effect.

In yet another form, an apparatus is provided comprising: a microphone array; spaced-apart loudspeakers including an active loudspeaker that is closest to the microphone array among the loudspeakers; and a controller coupled to the microphone array and the loudspeakers and configured to perform operations for: forming at the microphone array an audio receive beam having a main lobe pointed in a direction from which audio is to be received; determining which of the loudspeakers are not in the main lobe; identifying at least one additional loudspeaker among the loudspeakers determined not to be in the main lobe and that is farther away from the microphone array than the active loudspeaker; and spreading audio energy of input audio associated with, and intended for, the active loudspeaker across the active loudspeaker and the at least one additional loudspeaker, and no other ones of the loudspeakers, to reduce coupling of sound energy emitted by the active loudspeaker and the at least one additional loudspeaker to the microphone array based on a precedence effect.

In yet another form, a processor readable medium is provided to store instructions that, when executed by a processor of an endpoint including a microphone array and spaced-apart loudspeakers, cause the processor to perform the methods/operations described above.

The above description is intended by way of example only. Various modifications and structural changes may be made therein without departing from the scope of the concepts described herein and within the scope and range of equivalents of the claims.

What is claimed is:

1. A method comprising:
    at an endpoint device including a microphone array and spaced-apart loudspeakers including an active loudspeaker that is closest to the microphone array among the loudspeakers:
    forming at the microphone array an audio receive beam having a main lobe pointed in a direction from which audio is to be received;
    determining which of the loudspeakers are not in the main lobe;
    identifying at least one additional loudspeaker among the loudspeakers determined not to be in the main lobe and that is farther away from the microphone array than the active loudspeaker; and
    spreading audio energy of input audio associated with, and intended for, the active loudspeaker across the active loudspeaker and the at least one additional loudspeaker, and no other ones of the loudspeakers, to reduce coupling of sound energy emitted by the active loudspeaker and the at least one additional loudspeaker to the microphone array based on a precedence effect.

2. The method of claim 1, wherein the spreading the audio energy includes:
    generating from the input audio, reduced-amplitude audio having a reduced amplitude relative to the input audio;
    driving the active loudspeaker with the reduced-amplitude audio; and
    driving the at least one additional loudspeaker based on the reduced-amplitude audio.

3. The method of claim 2, further comprising:
    time-delaying the reduced-amplitude audio to produce time-delayed reduced-amplitude audio,
    wherein the driving the at least one additional loudspeaker based on the reduced-amplitude audio includes driving the at least one additional loudspeaker with the time-delayed reduced-amplitude audio.

4. The method of claim 3, wherein the driving the at least one additional loudspeaker based on the reduced-amplitude audio further includes:
    summing the time-delayed reduced-amplitude audio with input audio associated with, and intended for, the at least one additional loudspeaker, to produce summed audio; and
    driving the at least one additional loudspeaker with the summed audio.

5. The method of claim 1, wherein:
    the spaced-apart loudspeakers include a left loudspeaker, a right loudspeaker, and a center loudspeaker as the active loudspeaker that is positioned closest to the microphone array;
    the determining includes determining which of the left loudspeaker, the right loudspeaker, and the center loudspeaker are not in the main lobe;
    the identifying includes identifying as the at least one additional loudspeaker at least one of the left loudspeaker and the right loudspeaker; and
    the spreading the audio energy includes spreading the audio energy of input audio associated with, and intended for, the center loudspeaker across the center loudspeaker and the at least one of the left loudspeaker and the right loudspeaker.

6. The method of claim 5, wherein the spreading the audio energy of the input audio associated with, and intended for, the center loudspeaker further includes:
    generating from the input audio associated with, and intended for, the center loudspeaker reduced-amplitude audio; and
    driving the center loudspeaker with the reduced-amplitude audio and driving the at least one of the left loudspeaker and the right loudspeaker with a time-delayed version of the reduced-amplitude audio.

7. The method of claim 5, wherein the input audio associated with, and intended for, the center loudspeaker is mono channel audio.

8. The method of claim 1, wherein:
    the microphone array includes individual microphones to produce individual microphone signals from audio received at the microphone array; and
    the forming the audio receive beam includes forming the audio receive beam based on the individual microphone signals.

9. The method of claim 1, further comprising:
    switching from the audio receive beam having the main lobe pointed in the direction to a second audio receive beam having a second main lobe pointed in a second direction different from the direction;
    repeating the determining, the identifying, and the spreading for the second main lobe, resulting in identifying a second additional loudspeaker different from the at least one additional loudspeaker for the main lobe; and
    during a transition from the spreading for the main lobe to spreading for the second main lobe, cross-fading over a time period the audio energy from the at least one additional loudspeaker to the second additional loudspeaker.

10. A method comprising:
    at an endpoint device including a microphone array and spaced-apart loudspeakers including side loudspeakers and center loudspeakers positioned between the side loudspeakers and closer to the microphone array than the side loudspeakers:
    forming at the microphone array an audio receive beam having a main lobe pointing in a direction from which audio is to be received;
    determining which of the center loudspeakers and the side loudspeakers are in the main lobe; and
    based on results of the determining, spreading audio energy of input audio associated with, and intended for, the center loudspeakers across only one of the center loudspeakers and at least one of the side loudspeakers, to reduce coupling of sound energy emitted by the one of the center loudspeakers and the at least one of the side loudspeakers to the microphone array based on a precedence effect.

11. The method of claim 10, further comprising:
    generating from the input audio, reduced-amplitude audio having an amplitude that is reduced with respect to the input audio; and
    time-delaying the reduced-amplitude audio to produce time-delayed reduced-amplitude audio,
    wherein the spreading the audio energy includes:
        driving the one of the center loudspeakers with the reduced-amplitude audio; and
        driving the at least one of the side loudspeakers with the time-delayed reduced-amplitude audio.

12. The method of claim 11, wherein:
the determining includes determining which of the center loudspeakers is in the main lobe; and
the spreading the audio energy includes, if none of the center loudspeakers are in the main lobe:
- driving the one of the centers loudspeakers with the reduced-amplitude audio; and
- driving each of the side loudspeakers with the time-delayed reduced-amplitude audio.

13. The method of claim 12, wherein:
the side loudspeakers include a left loudspeaker and a right loudspeaker, and the center loudspeakers include a center-left loudspeaker closer to the left loudspeaker and a center-right loudspeaker closer to the right loudspeaker;
the determining further includes, if the center-left loudspeaker is in the main lobe, determining whether the left loudspeaker is in the main lobe; and
if the center-left loudspeaker is in the main lobe and the left loudspeaker is in the main lobe, the spreading the audio energy includes:
- driving the center-right loudspeaker with the reduced-amplitude audio; and
- driving the right loudspeaker but not the left loudspeaker with the time-delayed reduced amplitude audio.

14. The method of claim 13, wherein:
if the center-left loudspeaker is in the main lobe, and the left loudspeaker is not in the main lobe, the spreading the audio energy includes:
- driving the center-right loudspeaker with the reduced-amplitude audio; and
- driving the left loudspeaker and the right loudspeaker with the time-delayed reduced amplitude audio.

15. The method of claim 12, wherein:
the side loudspeakers include a left loudspeaker and a right loudspeaker, and the center loudspeakers include a center-left loudspeaker closer to the left loudspeaker and a center-right loudspeaker closer to the right loudspeaker;
the determining further includes, if the center-right loudspeaker is in the main lobe, determining whether the right loudspeaker is in the main lobe; and
if the center-right loudspeaker is in the main lobe and the right loudspeaker is in the main lobe, the spreading the audio energy includes:
- driving the center-left loudspeaker with the reduced-amplitude audio; and
- driving the left loudspeaker but not the right loudspeaker with the time-delayed reduced amplitude audio.

16. The method of claim 15, wherein:
if the center-right loudspeaker is in the main lobe, and the right loudspeaker is not in the main lobe the spreading the audio energy includes:
- driving the center-left loudspeaker with the reduced-amplitude audio; and
- driving the left loudspeaker and the right loudspeaker with the time-delayed reduced amplitude audio.

17. The method of claim 11, further comprising:
summing the time-delayed reduced-amplitude audio with input audio associated with, and intended for, the at least one of the side loudspeakers, to produce summed audio; and
driving the at least one of the side loudspeakers with the summed audio.

18. An apparatus comprising:
a microphone array;
spaced-apart loudspeakers including an active loudspeaker that is closest to the microphone array among the loudspeakers; and
a controller coupled to the microphone array and the loudspeakers and configured to perform operations for:
- forming at the microphone array an audio receive beam having a main lobe pointed in a direction from which audio is to be received;
- determining which of the loudspeakers are not in the main lobe;
- identifying at least one additional loudspeaker among the loudspeakers determined not to be in the main lobe and that is farther away from the microphone array than the active loudspeaker; and
- spreading audio energy of input audio associated with, and intended for, the active loudspeaker across the active loudspeaker and the at least one additional loudspeaker, and no other ones of the loudspeakers, to reduce coupling of sound energy emitted by the active loudspeaker and the at least one additional loudspeaker to the microphone array based on a precedence effect.

19. The apparatus of claim 18, wherein the operations for spreading the audio energy include operations for:
generating from the input audio, reduced-amplitude audio having a reduced amplitude relative to the input audio;
driving the active loudspeaker with the reduced-amplitude audio; and
driving the at least one additional loudspeaker based on the reduced-amplitude audio.

20. The apparatus of claim 19, wherein the processor is further configured to perform operations for:
time-delaying the reduced-amplitude audio to produce time-delayed reduced-amplitude audio,
wherein the driving the at least one additional loudspeaker based on the reduced-amplitude audio includes driving the at least one additional loudspeaker with the time-delayed reduced-amplitude audio.

* * * * *